US012749677B2

(12) United States Patent
Park et al.

(10) Patent No.: US 12,749,677 B2
(45) Date of Patent: Sep. 29, 2026

(54) NEGATIVE ELECTRODE ACTIVE MATERIAL, NEGATIVE ELECTRODE COMPRISING NEGATIVE ELECTRODE ACTIVE MATERIAL, SECONDARY BATTERY COMPRISING NEGATIVE ELECTRODE, AND METHOD FOR PREPARING NEGATIVE ELECTRODE ACTIVE MATERIAL

(71) Applicant: LG ENERGY SOLUTION, LTD., Seoul (KR)

(72) Inventors: Semi Park, Daejeon (KR); Sun Young Shin, Daejeon (KR); Ilgeun Oh, Daejeon (KR); Su Min Lee, Daejeon (KR); Yong Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 629 days.

(21) Appl. No.: 18/270,542

(22) PCT Filed: Jul. 27, 2022

(86) PCT No.: PCT/KR2022/011060
§ 371 (c)(1),
(2) Date: Jun. 30, 2023

(87) PCT Pub. No.: WO2023/033370
PCT Pub. Date: Mar. 9, 2023

(65) Prior Publication Data

US 2024/0063371 A1 Feb. 22, 2024

(30) Foreign Application Priority Data

Sep. 3, 2021 (KR) ........................ 10-2021-0117633

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/364* (2013.01); *H01M 4/382* (2013.01); *H01M 4/483* (2013.01);
(Continued)

(58) Field of Classification Search
CPC ..... H01M 2004/021; H01M 2004/027; H01M 4/13; H01M 4/139; H01M 4/362;
(Continued)

(56) References Cited

U.S. PATENT DOCUMENTS

2014/0030599 A1 1/2014 Lee et al.
2015/0380733 A1 12/2015 Lee et al.
(Continued)

FOREIGN PATENT DOCUMENTS

CN 107004830 A 8/2017
JP 2014-26949 A 2/2014
(Continued)

OTHER PUBLICATIONS

Japanese Office Action for Japanese Application No. 2023-544572, dated Aug. 26, 2024, with English translation.
(Continued)

*Primary Examiner* — Lingwen R Zeng
(74) *Attorney, Agent, or Firm* — Birch, Stewart, Kolasch & Birch, LLP

(57) ABSTRACT

A negative electrode active material including: silicon-containing composite particles including (a) $SiO_x$, wherein $0<x<2$, (b) pores, and (c) a Mg compound or a Li compound; an outer carbon layer present on the surface of the silicon-containing composite particle; and an inner carbon layer
(Continued)

present inside the pores, in which a BET specific surface area of the negative electrode active material is 3 $m^2/g$ to 15 $m^2/g$, a negative electrode including the same, a secondary battery including the negative electrode and a method for preparing the negative electrode active material.

13 Claims, 1 Drawing Sheet

(51) Int. Cl.

| | |
|---|---|
| ***H01M 4/48*** | (2010.01) |
| ***H01M 4/583*** | (2010.01) |
| *H01M 4/02* | (2006.01) |
| *H01M 4/13* | (2010.01) |
| *H01M 4/139* | (2010.01) |
| *H01M 4/587* | (2010.01) |
| *H01M 4/62* | (2006.01) |

(52) U.S. Cl.

CPC ...... *H01M 4/583* (2013.01); *H01M 2004/021* (2013.01); *H01M 2004/027* (2013.01); *H01M 4/13* (2013.01); *H01M 4/139* (2013.01); *H01M 4/362* (2013.01); *H01M 4/587* (2013.01); *H01M 4/625* (2013.01); *Y02E 60/10* (2013.01)

(58) Field of Classification Search

CPC ...... H01M 4/364; H01M 4/366; H01M 4/382; H01M 4/483; H01M 4/583; H01M 4/587; H01M 4/625; Y02E 60/10

See application file for complete search history.

(56) References Cited

U.S. PATENT DOCUMENTS

| | | | | |
|---|---|---|---|---|
| 2016/0197342 | A1 | 7/2016 | Lee et al. | |
| 2017/0271651 | A1 | 9/2017 | Behan et al. | |
| 2020/0295352 | A1 | 9/2020 | Oh | |
| 2020/0350571 | A1 | 11/2020 | Lee et al. | |
| 2021/0184204 | A1* | 6/2021 | Oh ........................ | H01M 4/134 |
| 2023/0049476 | A1 | 2/2023 | Lee et al. | |

FOREIGN PATENT DOCUMENTS

| | | | |
|---|---|---|---|
| JP | 2016-167352 | A | 9/2016 |
| KR | 10-2013-0016727 | A | 2/2013 |
| KR | 10-2015-0032015 | A | 3/2015 |
| KR | 10-2015-0050168 | A | 5/2015 |
| KR | 10-2018-0035752 | A | 4/2018 |
| KR | 10-2019-0066596 | A | 6/2019 |
| KR | 10-2019-0101787 | A | 9/2019 |
| KR | 10-2019-0104895 | A | 9/2019 |
| KR | 10-2185490 | B1 | 12/2020 |
| KR | 10-2021-0035634 | A | 4/2021 |
| KR | 10-2021-0094685 | A | 7/2021 |

OTHER PUBLICATIONS

Extended European Search Report for European Application No. 22864879.8, dated Sep. 26, 2024.

International Search Report (PCT/ISA/210) issued in PCT/KR2022/011060, dated Nov. 18, 2022.

Chinese Office Action and Search Report for Chinese Application No. 202280011154.3, dated Apr. 17, 2026, with English translation of the Office Action.

* cited by examiner

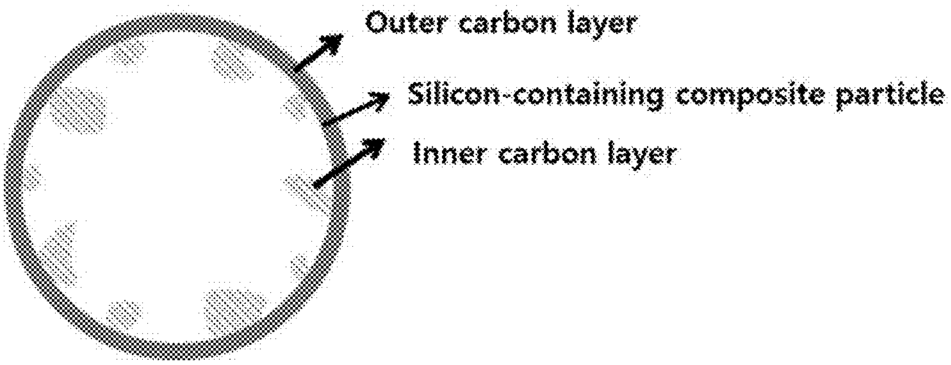
Outer carbon layer
Silicon-containing composite particle
Inner carbon layer

NEGATIVE ELECTRODE ACTIVE MATERIAL, NEGATIVE ELECTRODE COMPRISING NEGATIVE ELECTRODE ACTIVE MATERIAL, SECONDARY BATTERY COMPRISING NEGATIVE ELECTRODE, AND METHOD FOR PREPARING NEGATIVE ELECTRODE ACTIVE MATERIAL

TECHNICAL FIELD

This application claims priority to and the benefit of Korean Patent Application No. 10-2021-0117633 filed in the Korean Intellectual Property Office on Sep. 3, 2021, the entire contents of which are incorporated herein by reference.

The present invention relates to a negative electrode active material, a negative electrode including the negative electrode active material, a secondary battery including the negative electrode, and a method for preparing the negative electrode active material.

BACKGROUND ART

Demands for the use of alternative energy or clean energy are increasing due to the rapid increase in the use of fossil fuels, and as a part of this trend, the most actively studied field is a field of electricity generation and electricity storage using an electrochemical reaction.

Currently, representative examples of an electrochemical device using such electrochemical energy include a secondary battery, and the usage areas thereof are increasing more and more. Recently, as the technological development and demand for portable devices such as portable computers, portable phones, and cameras have increased, the demand for secondary batteries as an energy source has increased sharply, and numerous studies have been conducted on a lithium secondary battery having a high energy density, that is, a high capacity among such secondary batteries, and the lithium secondary battery having a high capacity has been commercialized and widely used.

In general, a secondary battery includes a positive electrode, a negative electrode, an electrolyte solution, and a separator. The negative electrode includes a negative electrode active material for intercalating and de-intercalating lithium ions from the positive electrode, and as the negative electrode active material, a silicon-containing particle having high discharge capacity may be used. However, $SiO_2$ in silicon-containing particles such as $SiO_x$ ($0 \leq x < 2$) partially react with lithium ions delivered from the positive electrode to produce lithium silicates, and the lithium silicates irreversibly act, and thus are a cause of reducing the initial efficiency of the battery. Further, the volume of the silicon-containing particles changes too much during the charging/discharging process, causing a side reaction with an electrolytic solution. Therefore, there occurs a problem in that the service life of the battery is reduced.

In order to solve the problem in the related art, a technique of improving the initial efficiency by intentionally doping silicon-containing particles with a metal, such as Mg, to block a reaction site which may be irreversibly formed has been used. However, when the technique is applied, there is a disadvantage in that a discharging capacity per weight of a negative electrode active material is excessively reduced according to metal doping.

Thus, a technique of removing some of a metal compound by a doped metal has also been used. However, a side reaction between a negative electrode active material and an electrolytic solution occurs due to a plurality of large pores when the above technique is used, so that there is a problem in that the service life performance of a battery is reduced.

Meanwhile, a technique of forming a carbon layer has been used in order to improve the conductivity of the negative electrode active material. However, there is a problem in that it is difficult to uniformly dispose the carbon layer on the surface of and inside of the negative electrode active material using a general carbon layer preparation method, so that the degree of improvement in service life performance of a battery is not large.

Therefore, there is a need for a negative electrode active material having pores with a small size and appropriately provided with an outer carbon layer and an inner carbon layer and a method for preparing the negative electrode active material.

RELATED ART DOCUMENTS (Patent Document 1) Korean Patent Publication Laid-Open No. 10-2019-0104895

DETAILED DESCRIPTION OF THE INVENTION

Technical Problem

The present invention has been made in an effort to provide a negative electrode active material capable of improving the initial efficiency and discharge capacity of a battery.

The present invention has also been made in an effort to provide a negative electrode including the negative electrode active material.

The present invention has also been made in an effort to provide a secondary battery including the negative electrode.

The present invention has also been made in an effort to provide a method for preparing the negative electrode active material.

Technical Solution

An exemplary embodiment of the present invention provides a negative electrode active material including: silicon-containing composite particles including (a) $SiO_x$, wherein $0<x<2$, (b) pores, and (c) a Mg compound or a Li compound; an outer carbon layer present on the surface of the silicon-containing composite particles; and an inner carbon layer provided inside the pores, in which a BET specific surface area of the negative electrode active material is 3 $m^2/g$ to 15 $m^2/g$.

Another exemplary embodiment provides a method for preparing a negative electrode active material, the method including: forming silicon-containing composite particles including $SiO_x$, wherein 0<<<2, and including pores from preliminary silicon-containing composite particles including a Mg compound or a Li compound; forming a preliminary negative electrode active material including an outer carbon layer and an inner carbon layer by disposing a carbonaceous precursor on the silicon-containing composite particles, and then subjecting the carbonaceous precursor to a first heat treatment; and subjecting the preliminary negative electrode active material to a second heat treatment.

Still another exemplary embodiment provides a negative electrode including the above-described negative electrode active material.

Yet another exemplary embodiment provides a secondary battery including the above-described negative electrode.

Advantageous Effects

For the negative electrode active material according to an exemplary embodiment of the present invention, the number of side reactions between an electrolytic solution and the negative electrode active material is reduced when a battery is driven, so that the service life characteristics of the battery can be improved.

Since the negative electrode active material includes a metal compound and silicon-containing composite particles from which $SiO_2$ is at least partially removed, the discharge capacity and initial efficiency of the battery can be improved.

Due to an outer carbon layer provided on the surface of the silicon-containing composite particle and an inner carbon layer provided inside the pores, the volume change of the negative electrode active material can be readily suppressed during the charging/discharging process of the battery, so that the service life characteristics of the battery can be improved.

In the process of preparing the negative electrode active material according to an exemplary embodiment of the present invention, since the pore size of the silicon-containing composite particles is at a low level before a carbon layer is formed, the size of the pores can be easily controlled (the size of pores is decreased and the number of pores is reduced) by a heat treatment.

The negative electrode active material according to the present invention has a BET specific surface area of 3 $m^2/g$ to 15 $m^2/g$, and has a value lower than the BET specific surface area of metal-doped silicon-containing particles including a general carbon layer. In the case of general particles in the related art, the BET specific surface area has a large value because the size of pores is not controlled, whereas the negative electrode active material of the present invention has a small specific surface area because the size of pores and the number of pores are effectively controlled, so that the side reaction between the electrolytic solution and the negative electrode active material during charging and discharging of the battery can be reduced, and the service life characteristics of the battery can be improved.

BRIEF DESCRIPTION OF DRAWINGS

The FIGURE schematically illustrates the structure of a negative electrode active material according to an exemplary embodiment of the present specification.

BEST MODE

Hereinafter, the present invention will be described in more detail in order to help the understanding of the present invention.

The terms or words used in the present specification and the claims should not be construed as being limited to typical or dictionary meanings, and should be construed as meanings and concepts conforming to the technical spirit of the present invention on the basis of the principle that an inventor can appropriately define concepts of the terms in order to describe his or her own invention in the best way.

The terms used in the present specification are used only to describe exemplary embodiments, and are not intended to limit the present invention. Singular expressions include plural expressions unless the context clearly indicates otherwise.

In the present invention, the term "comprise", "include", or "have" is intended to indicate the presence of the characteristic, number, step, constituent element, or any combination thereof implemented, and should be understood to mean that the presence or addition possibility of one or more other characteristics or numbers, steps, constituent elements, or any combination thereof is not precluded.

In the present specification, the size of pores may mean an average value of diameters of pores included in a negative electrode active material. That is, the size may indicate the average diameter of pores.

In the present specification, the crystallinity of a structure included in a negative electrode active material may be confirmed by X-ray diffraction analysis, the X-ray diffraction analysis may be performed using an X-ray diffraction (XRD) analyzer (trade name: D4-endavor, manufacturer: Bruker), and in addition to the apparatus, an apparatus used in the art may be appropriately employed. In an example, the coating layer may be amorphous when no crystalline peaks derived from a specific coating layer appear during X-ray diffraction analysis of the negative electrode active material. Specifically, in the case of XRD, crystalline peaks are detected, and it can be confirmed that when there is no difference in XRD graph of the negative electrode active material before and after the coating of a specific coating layer, the crystalline peak derived from the coating layer does not appear and the coating layer is an amorphous coating layer.

In the present specification, an average particle size ($D_{50}$) may be defined as a particle size corresponding to 50% of a cumulative volume in a particle size distribution curve of the particles. The average particle diameter ($D_{50}$) may be measured using, for example, a laser diffraction method. The laser diffraction method can generally measure a particle size of about several mm from the submicron region, and results with high reproducibility and high resolution may be obtained.

In the present specification, a specific surface area may be measured by the BET 6-point method by degassing gas from an object to be measured at 130° C. for 5 hours using a BET measuring apparatus (BEL-SORP-MAX, Nippon Bell), and performing $N_2$ adsorption/desorption at 77 K.

In the present invention, the size of pores may be measured by an equation according to a Barrett-Joyer-Halenda (BJH) method by a nitrogen adsorption method. Specifically, a pore area according to the size of pores was derived using a BELSORP-mini II model manufactured by BEL Japan, Inc., and then the size of pores showing the largest pore area was employed as a representative pore size. The BJH method may be used, and in the plot of the measured values, the X-axis is the diameter (Dp/nm) of the pores, and the Y-axis is dVp/dDp ($cm^3\ g^{-1}\ nm^{-1}$).

<Negative Electrode Active Material>

The negative electrode active material according to an exemplary embodiment of the present specification includes: silicon-containing composite particles including $SiO_x$ ($0<x<2$) and pores, and including a Mg compound or a Li compound; an outer carbon layer provided on the surface of the silicon-containing composite particle; and an inner carbon layer provided inside the pores, in which a BET specific surface area is 3 $m^2/g$ to 15 $m^2/g$.

In the present specification, the fact that an outer carbon layer is provided on the surface of the silicon-containing composite particle means that the carbon layer is located on the external surface of the silicon-containing composite particle, except for pores. The outer carbon layer may be in the form of partially covering at least a part of the surface of the silicon-containing composite particle, that is, the surface of the particle, or entirely covering the surface of the particle.

In the present specification, the fact that the inner carbon layer is provided in the pore of the silicon-containing composite particle means that the carbon layer is located on the surface and/or in the internal space of the pore formed in the silicon-containing composite particle. The inner carbon layer may be in the form of partially covering at least a part in the pore included in the silicon-containing composite particle, that is, the inside of the pore, entirely covering the inside of the pore, or provided inside the pores.

The presence of the outer and inner carbon layers of the negative electrode active material may be confirmed by TEM or SEM. Specifically, the presence of the inner carbon layer may be confirmed through energy dispersive spectrometer (EDAX) analysis of the SEM cross section.

The FIGURE schematically illustrates the structure of a negative electrode active material according to an exemplary embodiment of the present specification, and the negative electrode active material according to an exemplary embodiment of the present specification includes an outer carbon layer and an inner carbon layer. Specifically, the outer carbon layer may be present in the form of covering the surface of the silicon-containing composite particle, and the inner carbon layer may be present in the form of being located in the pores included in the silicon-containing composite particles.

The negative electrode active material according to an exemplary embodiment of the present specification includes silicon-containing composite particles. The silicon-containing composite particles include $SiO_x$ ($0<x<2$) and pores, and include a Mg compound or a Li compound.

The silicon-containing composite particles include $SiO_x$ ($0<x<2$), a Mg compound and pores.

The $SiO_x$ ($0<x<2$) corresponds to a matrix in the silicon-containing composite particle. The $SiO_x$ ($0<x<2$) may be in a form including Si and $SiO_2$, and the Si may also form a phase. That is, the x corresponds to the number ratio of O for Si included in the $SiO_x$ ($0<x<2$). When the silicon-containing composite particles include the $SiO_x$($0<x<2$), the discharge capacity of a secondary battery may be improved.

In an exemplary embodiment of the present specification, the Mg compound may correspond to a matrix in the silicon-containing composite particle.

The Mg compound may be present inside and/or on the surface of the $SiO_x$ ($0<x<2$). The initial efficiency of the battery may be improved by the Mg compound.

The Mg compound may include at least one selected from the group consisting of Mg silicates, Mg silicides and Mg oxides. The Mg silicate may include at least one of $Mg_2SiO_4$ and $MgSiO_3$. The Mg silicide may include $Mg_2Si$. The Mg oxide may include MgO.

In an exemplary embodiment of the present specification, the Mg element may be included in an amount of 0.1 wt % to 20 wt %, or included in an amount of 0.1 wt % to 10 wt %, based on total 100 wt % of the negative electrode active material. Specifically, the Mg element may be included in an amount of 0.5 wt % to 8 wt %, or 0.8 wt % to 4 wt %. When the above range is satisfied, the Mg compound may be included in an appropriate content in the negative electrode active material, so that the volume change of the negative electrode active material during the charging and discharging of a battery may be readily suppressed, and the discharge capacity and initial efficiency of the battery may be improved.

The silicon-containing composite particles include $SiO_x$ ($0<x<2$), a Li compound and pores.

In an exemplary embodiment of the present specification, the Li compound may correspond to a matrix in the silicon-containing composite particle.

In an exemplary embodiment of the present specification, the Li compound may be present inside and/or on the surface of the $SiO_x$ ($0<x<2$). The initial efficiency of the battery may be improved by the Li compound.

The Li compound may include at least one selected from the group consisting of Li silicates, Li silicides and Li oxides. The Li silicate may include at least one of $Li_2SiO_3$, $Li_4SiO_4$ and $Li_2Si_2O_5$. The Li silicide may include $Li_2Si_2$. The Li oxide may include $Li_2O$.

In an exemplary embodiment of the present invention, the Li compound may be present in the form of a lithium silicate. The lithium silicate is represented by $Li_aSi_bO_c$ ($2\leq a\leq 4$, $0<b\leq 2$, $25\leq c\leq 5$) and may be classified into crystalline lithium silicate and amorphous lithium silicate. The crystalline lithium silicate may be present in the form of at least one lithium silicate selected from the group consisting of $Li_2SiO_3$, $Li_4SiO_4$ and $Li_2Si_2O_5$ in the silicon-containing composite particles, and the amorphous lithium silicate may be in the form of $Li_aSi_bO_c$ ($2\leq a\leq 4$, $0<b\leq 2$, $2\leq c\leq 5$), and are not limited to the forms.

In an exemplary embodiment of the present specification, the Li element may be included in an amount of 0.1 wt % to 20 wt %, or included in an amount of 0.1 wt % to 10 wt %, based on total 100 wt % of the negative electrode active material. Specifically, the Li element may be included in an amount of 0.5 wt % to 8 wt %, and more specifically 0.5 wt % to 4 wt %. When the above range is satisfied, the Li compound may be included in an appropriate content in the negative electrode active material, so that the volume change of the negative electrode active material during the charging and discharging of a battery may be readily suppressed, and the discharge capacity and initial efficiency of the battery may be improved.

The content of the Mg element or Li element may be confirmed by ICP analysis. For the ICP analysis, after a predetermined amount (about 0.01 g) of the negative electrode active material is exactly aliquoted, the negative electrode active material is completely decomposed on a hot plate by transferring the aliquot to a platinum crucible and adding nitric acid, hydrofluoric acid, or sulfuric acid thereto. Thereafter, a reference calibration curve is prepared by measuring the intensity of a standard liquid prepared using a standard solution (5 mg/kg) in an intrinsic wavelength of the Mg element or Li element using an inductively coupled plasma atomic emission spectrometer (ICPAES, Perkin-Elmer 7300). Thereafter, a pre-treated sample solution and a blank sample are each introduced into the apparatus, an actual intensity is calculated by measuring each intensity, the concentration of each component relative to the prepared calibration curve is calculated, and then the contents of the Mg element or the Li element of the prepared negative electrode active material may be analyzed by converting the total sum so as to be the theoretical value.

In an exemplary embodiment of the present specification, the silicon-containing composite particles may have a BET specific surface area of 3 $m^2/g$ to 80 $m^2/g$, specifically 10 $m^2/g$ to 60 $m^2/g$, and more specifically, 15 $m^2/g$ to 50 $m^2/g$.

When the silicon-containing composite particles have a BET specific surface area of less than 3 $m^2/g$, the service life characteristics of the battery may deteriorate because the change in volume of the negative electrode active material cannot be effectively suppressed during charging and discharging. When the silicon-containing composite particles have a BET specific surface area of more than 80 $m^2/g$, the service life characteristics of the battery may deteriorate because a side reaction between the electrolytic solution and the negative electrode active material is increased.

In an exemplary embodiment of the present specification, the surface of the silicon-containing composite particle is provided with an outer carbon layer, and the inside of the pores of the silicon-containing composite particle is provided with an inner carbon layer. By forming a carbon layer on the surface of the silicon-containing composite particle and inside the pores as described above, conductivity is imparted to the silicon-containing composite particles, and the initial efficiency, service life characteristics, and battery capacity characteristics of a secondary battery including the negative electrode active material including the silicon-containing composite particles may be improved.

In an exemplary embodiment of the present specification, the outer carbon layer or inner carbon layer may include at least one of amorphous carbon and crystalline carbon.

The crystalline carbon may further improve the conductivity of the silicon-containing composite particles. The crystalline carbon may include at least one selected from the group consisting of fullerene, carbon nanotube and graphene.

The amorphous carbon may suppress the expansion of the silicon-containing composite particles by appropriately maintaining the strength of the carbon layer. The amorphous carbon may be a carbon-based material formed using at least any one carbide selected from the group consisting of tar, pitch and other organic materials, or a hydrocarbon as a source of a chemical vapor deposition method.

The carbide of the other organic materials may be a carbide of sucrose, glucose, galactose, fructose, lactose, mannose, ribose, aldohexose or ketohexose and a carbide of an organic material selected from combinations thereof.

The hydrocarbon may be a substituted or unsubstituted aliphatic or alicyclic hydrocarbon, or a substituted or unsubstituted aromatic hydrocarbon. The aliphatic or alicyclic hydrocarbon of the substituted or unsubstituted aliphatic or alicyclic hydrocarbon may be methane, ethane, ethylene, acetylene, propane, butane, butene, pentane, isobutane, hexane, or the like. Examples of the aromatic hydrocarbon of the substituted or unsubstituted aromatic hydrocarbon include benzene, toluene, xylene, styrene, ethylbenzene, diphenylmethane, naphthalene, phenol, cresol, nitrobenzene, chlorobenzene, indene, coumarone, pyridine, anthracene, phenanthrene, or the like.

In an exemplary embodiment of the present specification, the total weight of the outer carbon layer and the inner carbon layer may be 5 wt % to 40 wt % based on total 100 wt of the negative electrode active material. Specifically, the outer carbon layer and the inner carbon layer may be included in an amount of 5 wt % to 37 wt %, 10 wt % to 37 wt %, or 20 wt % to 37 wt %. When the above range is satisfied, the conductivity of the negative electrode active material is improved, and the volume change of the negative electrode active material during the charging and discharging of a battery is readily suppressed, so that the service life characteristics of the battery may be improved. The lower limit of the total weight of the carbon layer may be 5 wt %, 10 wt %, 15 wt % or 20 wt %%, and the upper limit thereof may be 40 wt %, 38 wt %, 37 wt % or 36 wt %.

In an exemplary embodiment of the present specification, the outer carbon layer may be included in an amount of 1 wt, to 10 wt %, specifically 2 wt % to 9 wt %, and more specifically 2 wt % to 8 wt %, based on total 100 wt % of the negative electrode active material. When the above range is satisfied, the change in volume of the negative electrode active material during the charging and discharging of the battery may be effectively suppressed. The lower limit of the content of the outer carbon layer may be 1 wt %, 2 wt % or 2.5 wt %, and the upper limit thereof may be 10 wt %, 9 wt %, 8 wt %, 7 wt % or 6 wt %.

In an exemplary embodiment of the present specification, the inner carbon layer may be included in an amount of 4 wt to 35 wt %, or 4 wt % to 34 wt %, or 10 wt % to 34 wt %, based on total 100 wt % by weight of the negative electrode active material. The inner carbon layer may be included in an amount of specifically, 8 wt % to 30 wt %, and more specifically, 10 wt % to 30 wt %. When the above range is satisfied, the conductivity of the negative electrode active material is improved, so that the service life characteristics of the battery may be improved. The lower limit of the inner carbon layer content may be 4 wt %, 6 wt %, 8 wt %, 10 wt %, 12 wt %, 14 wt %, 16 wt %, 18 wt %, 20 wt %, or 21 wt %, and the upper limit thereof may be 35 wt %, 34 wt %, 33 wt %, 32 wt %, 31 wt % or 30 wt %.

The content of the entire carbon layer of the negative electrode active material may be measured by burning the sample together with a combustion improver in an oxygen stream using a CS analyzer.

The content of the outer carbon layer of the negative electrode active material may be confirmed by calculation using the size of the negative electrode active material particles, the thickness of the outer carbon layer, and the true density of the carbon layer, and the content of the inner carbon layer may be confirmed by calculation from the difference between the content of the entire carbon layer and the content of the outer carbon layer.

Specifically, since the circularity of the silicon-containing composite particle is 0.9 or more, the calculation is performed assuming that the silicon-containing particle is a sphere. The diameter of silicon-containing composite particles may be measured using a particle size analyzer before forming a carbon layer, and after the thickness of the outer carbon layer provided in the silicon-containing composite particles is measured through TEM after forming the carbon layer, the volume of each of the silicon-containing composite particles and the outer carbon layer is calculated from this measurement, and each mass and the content of the outer carbon layer may be calculated by multiplying the volume and the true density of the silicon-containing composite particles and the carbon layer. The true density may be measured using a pycnometer (AccuPyc1340, Micromeritics Instrument Corp. USZ).

In an exemplary embodiment of the present specification, the outer carbon layer may have a thickness of 1 nm to 500 nm, specifically, 5 nm to 300 nm, 10 nm to 100 nm, or 25 nm to 50 nm. When the above range is satisfied, the volume change of the negative electrode active material is readily suppressed and side reactions between an electrolytic solution and the negative electrode active material are suppressed, so that the service life characteristics of a battery may be improved.

The thickness of the outer carbon layer may be measured using TEM, and may mean the average value of the measured thicknesses.

In an exemplary embodiment of the present specification, the negative electrode active material may have a BET specific surface area of 3 $m^2/g$ to 15 $m^2/g$, specifically 5 $m^2/g$ to 15 $m^2/g$, and more specifically, 8 $m^2/g$ to 14 $m^2/g$. When the above range is satisfied, side reactions between an electrolytic solution and the negative electrode active material during the charging and discharging of a battery may be reduced, so that the service life characteristics of the battery may be improved. The lower limit of the BET specific surface area may be 3 $m^2/g$, 5 $m^2/g$, 6 $m^2/g$, 7 $m^2/g$ or 8 $m^2/g$, and the upper limit thereof may be 15 $m^2/g$, 14 $m^2/g$, 13 $m^2/g$, 12 $m^2/g$, 11 $m^2/g$ or 10 $m^2/g$.

The BET specific surface area generally corresponds to a value lower than the BET specific surface area of metal-doped silicon-containing particles including a carbon layer. In the case of common particles in the related art, a carbon layer is formed for silicon-containing composite particles whose pore size is not controlled, but in the case of silicon-containing composite particles whose pore size is not controlled, the size of the pores is not easily decreased even when heat is applied. Therefore, in the case of common particles in the related art, the BET specific surface area thereof has to be large. In contrast, in the present invention, since the silicon-containing composite particles whose pore size is controlled to a low level are used and an additional heat treatment after a carbon layer is formed is performed, the size and number of pores may be effectively controlled, so that a low specific surface area of 3 $m^2/g$ to 15 $m^2/g$ may be derived. In the present specification, the size of the pores included in the negative electrode active material means the size except for the inner carbon layer provided in the pores. That is, the size of the pores included in the negative electrode active material means a size of the pores before the carbon layer is formed.

In an exemplary embodiment of the present specification, the pores may have a size of 50 nm or less, specifically 1 nm to 40 nm, or 2 nm to 35 nm. In another exemplary embodiment, the pores may have a size of 5 nm to 35 nm, 10 nm to 35 nm, or 10 nm to 30 nm.

In an exemplary embodiment of the present specification, the lower limit of the pore size of the pores may be 1 nm, 2 nm, 3 nm, 4 nm, 5 nm, 6 nm, 7 nm, 8 nm, 9 nm or 10 nm, and the upper limit thereof may be 50 nm, 45 nm, 40 nm, 35 nm, 30 nm, 25 nm or 20 nm.

When the pores have a size more than 50 nm, the side reactions between an electrolytic solution and the silicon-containing composite particles are increased, so that the service life characteristics of the battery deteriorate. In addition, the size and number of pores cannot be controlled even when additional heat treatment is performed. The size of pores is particularly controlled by a process such as the synthesis, etching, and additional heat treatment of silicon composite particles, and corresponds to a lower value than the pore size of silicon-containing composite particles in the related art.

When the pores have a size less than 2 nm, the degree of the volume change of the battery becomes severe because it is difficult for the pores to accommodate an excessive change in the volume of the silicon-containing composite particles, and accordingly, the service life characteristics of the battery deteriorate. The size of pores is particularly controlled by a process such as the synthesis, etching, and additional heat treatment of silicon-containing composite particles, and corresponds to a lower value than the pore size of silicon-containing composite particles in the related art.

The negative electrode active material may have an average particle diameter ($D_{50}$) of 2 μm to 15 μm, specifically 3 μm to 12 μm, and more specifically 4 μm to 10 μm. When the above range is satisfied, side reactions between the negative electrode active material and an electrolytic solution may be controlled, and the discharge capacity and initial efficiency of the battery may be effectively implemented.

<Method for Preparing Negative Electrode Active Material>

The method for preparing a negative electrode active material according to an exemplary embodiment in the present specification includes: forming silicon-containing composite particles including $SiO_x$ (0<x<2), and including pores from preliminary silicon-containing composite particles including a Mg compound or a Li compound; forming a preliminary negative electrode active material including an outer carbon layer and an inner carbon layer by disposing a carbonaceous precursor on the silicon-containing composite particles, and then subjecting the carbonaceous precursor to a first heat treatment; and subjecting the preliminary negative electrode active material to a second heat treatment.

The content on the above-described negative electrode active material may be applied to the negative electrode active material.

The method for preparing a negative electrode active material according to an exemplary embodiment in the present specification includes: forming silicon-containing composite particles including pores from preliminary silicon-containing composite particles including $SiO_x$(0<x<2) and a Mg compound or a Li compound; forming a preliminary negative electrode active material including an outer carbon layer and an inner carbon layer by disposing a carbonaceous precursor on the silicon-containing composite particles, and then subjecting the carbonaceous precursor to a first heat treatment; and subjecting the preliminary negative electrode active material to a second heat treatment.

The preliminary silicon-containing composite particles are silicon-containing oxide particles including $SiO_x$ (0<x<2), and the silicon-containing oxide particles include one or more of a Mg compound and a Li compound. The Mg compound or Li compound is in a form in which the silicon-containing particles are doped with the compound, and may be distributed on the surface and/or inside of the silicon-containing particle.

In an exemplary embodiment of the present specification, the preliminary silicon-containing composite particles may be formed through forming a mixed gas by vaporizing a powder in which a Si powder and a $SiO_2$ powder are mixed and Li or Mg, respectively, and then mixing the vaporized powder and Li or Mg, and heat-treating the mixed gas.

In an exemplary embodiment of the present specification, the preliminary silicon-containing composite particles may be formed through forming a mixed gas by vaporizing a powder in which a Si powder and a $SiO_2$ powder are mixed and Mg, respectively, and then mixing the vaporized powder and Mg, and heat-treating the mixed gas in a vacuum state at 800° C. to 950° C. Further, an additional heat treatment may be performed after the above heat treatment, and the additional heat treatment may be performed at 800° C. to 1000° C.

The mixed powder of the Si powder and the $SiO_2$ powder may be vaporized by performing the heat treatment at 1000° C. to 1800° C. or 1200° C. to 1500° C., and the Mg powder may be vaporized by performing the heat treatment at 500° C. to 1200° C. or 600° C. to 800° C.

The heat-treating of the mixed gas in a vacuum state at 800° C. to 950° C. may include heat-treating a mixed gas in a vacuum state at 800° C. to 900° C. for 30 minutes to 1 hour and 30 minutes, and then further heat-treating the mixed gas at 850° C. to 900° C. for 2 hours to 4 hours.

Since the heat-treating of the mixed gas may be performed at a predetermined temperature, and accordingly, pores of the preliminary silicon-containing particles may be formed in a small size, pores may be formed in a small size in the silicon-containing composite particles even during a subsequent etching.

In the preliminary silicon-containing composite particles, the Mg compound may include the above-described Mg silicates, Mg silicides, Mg oxides, and the like.

In an exemplary embodiment of the present specification, the preliminary silicon-containing composite particles may be formed through forming a mixed gas by vaporizing a powder in which a Si powder and a $SiO_2$ powder are mixed and Li, respectively, and then mixing the vaporized powder and Li, and heat-treating the mixed gas in a vacuum state at 800° C. to 950° C. Further, an additional heat treatment may be performed after the above heat treatment, and the additional heat treatment may be performed at 800° C. to 1000° C.

In still another exemplary embodiment, the preliminary silicon-containing composite particles may be formed through forming silicon-containing oxide particles; and distributing a Li compound in the formed silicon-containing oxide particles.

The silicon-containing oxide particles may be formed by heat-treating a powder in which a Si powder and a $SiO_2$ powder are mixed. Specifically, after the mixed powder of the Si powder and the $SiO_2$ powder is heated and vaporized under vacuum, depositing the vaporized mixed gas may be included.

The mixed powder of Si powder and $SiO_2$ powder may be vaporized by performing heat treatment at 1000° C. to 1800° C. or 1200° C. to 1500° C.

The preliminary silicon-containing composite particles may be silicon-containing oxide particles including $SiO_x$ ($0<x<2$).

The distributing of the Li compound in the formed silicon-containing oxide particles includes mixing the silicon-containing oxide particles and a Li precursor. If necessary, the above steps may be performed under heat treatment or by using an electrochemical method.

The Li precursor may be, for example, a Li powder, LiOH, $Li_2O$, and the like, and is not limited thereto. The silicon-containing oxide particles and the Li precursor are mixed, and a heat treatment may be performed at 400° C. to 1,400° C., if necessary.

A heat treatment step after the formed silicon-containing oxide and the Li precursor are mixed may be performed in an inert atmosphere.

The heat treatment step after the formed silicon-containing oxide and the Li precursor are mixed may be performed in an inert atmosphere at 400° C. to 1400° C., 500° C. to 1000° C. or 700° C. to 900° C. Further, an additional heat treatment may be performed after the above heat treatment, and the additional heat treatment may be performed at 700° C. to 1100° C. or 800° C. to 1000° C.

In the preliminary silicon-containing negative electrode active material, the Li compound phase may include the above-described Li silicates, Li silicides, Li oxides, and the like.

In addition, the method may further comprise forming a carbon layer before distributing a Li compound in the silicon-containing oxide particles.

The forming of the carbon layer may be performed by a chemical vapor deposition (CVD) method, and specifically, may be performed by a chemical vapor deposition (CVD) method using at least one hydrocarbon gas selected from the group consisting of methane, ethane and acetylene. More specifically, the forming of the carbon layer may be performed by providing at least one hydrocarbon gas selected from the group consisting of methane, ethane and acetylene to the acid-treated composition for forming a negative electrode active material, and then heat-treating the composition by a chemical vapor deposition (CVD) method. By the method, a carbon layer may be formed on silicon-containing oxide particles at a uniform level, so that the volume expansion of the particles may be smoothly controlled and side reactions caused by an electrolytic solution may be prevented.

The forming of the carbon layer may be performed at a temperature in a range of 800° C. to 1100° C., preferably 850° C. to 1000° C., in terms of the fact that changes in crystalline phase and amorphous phase in the negative electrode active material prepared in the above step are prevented.

In an exemplary embodiment of the present invention, the method for preparing a negative electrode active material may include forming a surface layer on at least a part of the surface of the negative electrode active material. The surface layer may include at least one selected from the group consisting of aluminum phosphate and lithium phosphate. The surface layer may include aluminum phosphate and lithium phosphate.

In an exemplary embodiment of the present specification, the forming of the silicon-containing composite particles including pores from the preliminary silicon-containing composite particles may include etching the preliminary silicon-containing particles using an acid or a base. In this case, the acid may be at least one of hydrofluoric acid (HF), nitric acid ($HNO_3$), sulfuric acid ($H_2SO_4$) and hydrochloric acid (HCl), and the base may be at least one of sodium hydroxide (NaOH) and potassium hydroxide (KOH). Specifically, a mixed solution of hydrofluoric acid and ethanol may be used during the etching. Through the etching step, the discharge capacity and efficiency of a battery may be improved while the Mg compound or Li compound and $SiO_2$ of the preliminary silicon-containing composite particles are removed. The etching may be performed for 1 hour to 3 hours.

In this case, the pores of the formed silicon-containing composite particles may be formed in a small size.

In the case of pores which do not satisfy the above range, the change in the size of pores is not large even through the subsequent first heat treatment and second heat treatment because the size of the pores is large, but when the pores satisfy the above range, the size of the pores is small, so that the size of the pores may be easily controlled through the first heat treatment and the second heat treatment. Therefore, the size of disposed pores of the silicon-containing composite particles may be more readily decreased after forming a preliminary negative electrode active material including a carbon layer by subjecting the silicon-containing composite particles including the pores to a first heat treatment; and subjecting the preliminary negative electrode active material to a second heat treatment.

In an exemplary embodiment of the present specification, the forming of the preliminary negative electrode active material may include disposing a carbonaceous precursor on silicon-containing composite particles and then performing a first heat treatment.

In an exemplary embodiment of the present specification, the forming of the preliminary negative electrode active material may include disposing a carbonaceous precursor on the silicon-containing composite particles and then performing a first heat treatment. The carbonaceous precursor may be graphene, graphite and the like for the preparation of crystalline carbon, at least one carbide selected from the group consisting of tar, pitch and other organics for the preparation of amorphous carbon, or a carbon-containing material formed using hydrocarbon as a source for a chemical vapor deposition method.

The carbon layer formed by the first heat treatment of the carbonaceous precursor may include crystalline or amorphous carbon.

Specifically, a carbon layer including the crystalline carbon may be formed by mixing inorganic particles or inorganic oxide particles with crystalline carbon as a solid phase or a liquid phase, and then heat-treating the resulting mixture. A carbon layer including the amorphous carbon may be formed using a method of coating the surface of inorganic particle or inorganic oxide particle with an amorphous carbon precursor, and then heat-treating the coated particles to carbonize the coated particles.

In this case, the crystalline carbon may include graphene and graphite as typical examples thereof. As representative examples of the amorphous carbon precursor, it is possible to use resins such as a phenol resin, a naphthalene resin, a polyvinyl alcohol resin, a urethane resin, a polyimide resin, a furan resin, a cellulose resin, an epoxy resin, and a polystyrene resin, petroleum-based pitch, tar or low molecular weight heavy oil, and the like.

The first heat treatment may be performed at 600° C. to 1100° C. or 600° C. to 1000° C., specifically 700° C. to 1000° C., and more specifically 800° C. to 970° C. When the above range is satisfied, a carbon layer having an appropriate crystal structure may be readily formed on the surface of the negative electrode active material. A time for the first heat treatment may be 1 hour to 5 hours, and specifically 3 hours to 5 hours.

The method for preparing a negative electrode active material according to an exemplary embodiment of the present specification includes subjecting the preliminary negative electrode active material to a second heat treatment.

By heat-treating the preliminary negative electrode active material on which the outer carbon layer and the inner carbon layer are formed, the size and number of pores present in the preliminary negative electrode active material may be reduced. Accordingly, side reactions between the negative electrode active material and an electrolytic solution are reduced, so that the service life characteristics of a battery may be improved.

The second heat treatment may be performed at 600° C. to 1,100° C., and specifically 900° C. to 1,050° C. When the above range is satisfied, the size and number of pores of the silicon-containing composite particles may be effectively reduced. Accordingly, side reactions between the negative electrode active material and an electrolytic solution are reduced, so that the service life characteristics of a battery may be improved.

A time for the second heat treatment may be 1 hour to 5 hours, and specifically 3 hours to 4 hours.

The pores formed by the second heat treatment may have a size of 50 nm or less, specifically 1 nm to 40 nm, or 2 nm to 35 nm. In another exemplary embodiment, the pores may have a size of 5 nm to 35 nm, 10 nm to 35 nm, or 10 nm to 30 nm.

<Negative Electrode>

The negative electrode according to an exemplary embodiment of the present specification may include a negative electrode active material, and here, the negative electrode active material is the same as the negative electrode active material in the above-described exemplary embodiments. Specifically, the negative electrode may include a negative electrode current collector and a negative electrode active material layer disposed on the negative electrode current collector. The negative electrode active material layer may include the negative electrode active material. Furthermore, the negative electrode active material layer may further include a binder and/or a conductive material.

The negative electrode current collector is sufficient as long as the negative electrode current collector has conductivity without causing a chemical change to the battery, and is not particularly limited. For example, as the current collector, it is possible to use copper, stainless steel, aluminum, nickel, titanium, fired carbon, or a material in which the surface of aluminum or stainless steel is surface-treated with carbon, nickel, titanium, silver, and the like. Specifically, a transition metal, such as copper or nickel which adsorbs carbon well, may be used as a current collector. Although the current collector may have a thickness of 6 μm to 20 μm, the thickness of the current collector is not limited thereto.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also include various polymers thereof.

The conductive material is not particularly limited as long as the conductive material has conductivity without causing a chemical change to the battery, and for example, it is possible to use graphite such as natural graphite or artificial graphite; carbon black such as acetylene black, Ketjen black, channel black, furnace black, lamp black, and thermal black; a conductive fiber such as carbon fiber or metal fiber; a conductive tube such as a carbon nanotube; a metal powder such as a carbon fluoride powder, an aluminum powder, and a nickel powder; a conductive whisker such as zinc oxide and potassium titanate; a conductive metal oxide such as titanium oxide; a conductive material such as polyphenylene derivatives, and the like.

<Secondary Battery>

The secondary battery according to an exemplary embodiment of the present specification may include the negative electrode in the above-described exemplary embodiment. Specifically, the secondary battery may include a negative electrode, a positive electrode, a separator interposed between the positive electrode and the negative electrode, and an electrolyte solution, and the negative electrode is the same as the above-described negative electrode. Since the negative electrode has been described in detail, a specific description thereof will be omitted.

The positive electrode may include a positive electrode current collector and a positive electrode active material layer formed on the positive electrode current collector and including the positive electrode active material.

In the positive electrode, the positive electrode current collector is not particularly limited as long as the positive electrode current collector has conductivity without causing a chemical change to the battery, and for example, it is possible to use stainless steel, aluminum, nickel, titanium, fired carbon, or a material in which the surface of aluminum or stainless steel is surface-treated with carbon, nickel, titanium, silver, and the like. Further, the positive electrode current collector may typically have a thickness of 3 to 500 μm, and the adhesion of the positive electrode active material may also be enhanced by forming fine convex and concave irregularities on the surface of the current collector. For example, the positive electrode current collector may be used in various forms such as a film, a sheet, a foil, a net, a porous body, a foam body, and a non-woven fabric body.

The positive electrode active material may be a typically used positive electrode active material. Specifically, the positive electrode active material includes: a layered compound such as lithium cobalt oxide ($LiCoO_2$) and lithium nickel oxide ($LiNiO_2$) or a compound substituted with one or more transition metals; a lithium iron oxide such as $LiFe_3O_4$; a lithium manganese oxide such as chemical formula $Li_{1+c1}Mn_{2-c1}O_4$ ($0 \leq c1 \leq 0.33$), $LiMnO_3$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni site type lithium nickel oxide expressed as chemical formula $LiNi_{1-c2}Mc_2O_2$ (here, M is at least one selected from the group consisting of Co, Mn, Al, Cu, Fe, Mg, B and Ga, and c2 satisfies $0.01 \leq c2 \leq 0.3$); a lithium manganese composite oxide expressed as chemical formula $LiMn_{2-c3}M_{c3}O_2$ (here, M is at least any one selected from the group consisting of Co, Ni, Fe, Cr, Zn and Ta, and c3 satisfies $0.01 \leq c3 \leq 0.1$) or $Li_2Mn_3MO_8$ (here, M is at least any one selected from the group consisting of Fe, Co, Ni, Cu and Zn); $LiMn_2O_4$ in which Li of the chemical formula is partially substituted with an alkaline earth metal ion, and the like, but is not limited thereto. The positive electrode may be Li-metal.

The positive electrode active material layer may include a positive electrode conductive material and a positive electrode binder together with the above-described positive electrode active material.

In this case, the positive electrode conductive material is used to impart conductivity to the electrode, and can be used without particular limitation as long as the positive electrode conductive material has electron conductivity without causing a chemical change in a battery to be constituted. Specific examples thereof include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

Alternatively, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator separates the negative electrode and the positive electrode and provides a passage for movement of lithium ions, and can be used without particular limitation as long as the separator is typically used as a separator in a secondary battery, and in particular, a separator having an excellent ability to retain moisture of an electrolyte solution as well as low resistance to ion movement in the electrolyte solution is preferable. Specifically, it is possible to use a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator including a ceramic component or a polymeric material may be used to secure heat resistance or mechanical strength and may be selectively used as a single-layered or multi-layered structure.

Examples of the electrolyte solution include an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte solution may include a non-aqueous organic solvent and a metal salt.

As the non-aqueous organic solvent, it is possible to use, for example, an aprotic organic solvent, such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-based organic solvents, cyclic carbonates ethylene carbonate and propylene carbonate may be preferably used because the cyclic carbonates have high permittivity as organic solvents of a high viscosity and thus dissociate a lithium salt well, and such a cyclic carbonate may be more preferably used since the cyclic carbonate may be mixed with a linear carbonate of a low viscosity and low permittivity such as dimethyl carbonate and diethyl carbonate in an appropriate ratio and used to prepare an electrolyte solution having a high electric conductivity.

As the metal salt, a lithium salt may be used, the lithium salt is a material which is easily dissolved in the non-aqueous electrolyte solution, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)P^-$, $CF_3SO_3^-$, $CF_3CF_2SO_3^-$, $(CF_3SO_2)_2N^-$, $(FSO_2)_3N^-$, $CF_3CF_2(CF_3)_2CO^-$, $(CF_3SO_2)_2CH^-$, $(SFs)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte solution, for the purpose of improving the service life characteristics of a battery, suppressing the decrease in battery capacity, and improving the discharge capacity of the battery, one or more additives, such as, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte solution constituent components.

An exemplary embodiment of the present invention provides a battery module including the secondary battery as a unit cell, and a battery pack including the same. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

MODE FOR INVENTION

Hereinafter, preferred embodiments will be suggested to facilitate understanding of the present invention, but the embodiments are only provided to illustrate the present invention, and it is apparent to those skilled in the art that various alterations and modifications are possible within the scope and technical spirit of the present invention, and it is natural that such alterations and modifications also fall within the accompanying claims.

EXAMPLE 1

Example 1-1

(1) Formation of Preliminary Silicon-Containing Composite Particles 200 g of a powder in which a Si powder and a $SiO_2$ powder were uniformly mixed at a molar ratio of 1:1 and 10 g of Mg were heat-treated at 1,400° C. and 700° C., respectively, in a reduced pressure atmosphere to vaporize the Si powder, the $SiO_2$ powder, and the Mg. Particles were prepared by heat-treating a mixed gas in which the Si powder, the $SiO_2$ powder, and the Mg which had been vaporized were mixed in a chamber in a vacuum state at 800° C. for 1 hour, and then performing an additional heat treatment at a temperature of 900° C. for 3 hours. The particles were pulverized by a jet mill to form preliminary silicon-containing composite particles.

(2) Formation of Silicon-Containing Composite Particles

A mixed solution of hydrofluoric acid and ethanol was used as an etching solution. After the preliminary silicon-containing composite particles were put into the etching solution at a weight ratio of 20:1 and mixed for about 1 hour and 30 minutes, the resulting mixture was filtered, washed and dried to form silicon-containing composite particles. The prepared silicon-containing composite particles have an average particle diameter ($D_{50}$) of 5 μm, and a pore size of 20 nm.

(3) Formulation of Preliminary Negative Electrode Active Material

The silicon-containing composite particles were positioned in a hot zone of a CVD apparatus while maintaining an inert atmosphere by flowing Ar gas into the silicon-containing composite particles, and the methane was blown into the hot zone at 920° C. using Ar as a carrier gas to react the methane at $10^{-1}$ torr for 3 hours, thereby forming a preliminary negative electrode active material in which an outer carbon layer (thickness 30 nm) provided on the surface of the silicon-containing composite particle and an inner carbon layer provided inside the pores were formed.

(4) Preparation of Negative Electrode Active Material

A negative electrode active material was prepared by performing an additional heat treatment (second heat treatment) on the preliminary negative electrode active material in which the outer carbon layer and the inner carbon layer were formed at 950° C. for 3 hours to control the size and number of pores in the silicon-containing composite particles. The negative electrode active material has an average particle diameter ($D_{50}$) of 5 μm and a BET specific surface area of about 8.1 $m^2/g$, and a pore size of 15 nm.

The content of the Mg element in the negative electrode active material was 3.5 wt %, and the outer carbon layer and the inner carbon layer were included in a total weight of 25 wt % based on total 100 wt % of the negative electrode active material. Specifically, the outer carbon layer and the inner carbon layer were included in an amount of 3.5 wt % and 21.5 wt %, respectively, based on total 100 wt % of the negative electrode active material.

Example 1-2

A negative electrode active material was prepared in the same manner as in Example 1-1, except that preliminary silicon-containing composite particles were mixed in the etching solution for 2 hours.

Example 1-3

A negative electrode active material was prepared in the same manner as in Example 1-1, except that methane was reacted with the silicon-containing composite particles in a hot zone at 920° C. for 5 hours.

Example 1-4

A negative electrode active material was prepared in the same manner as in Example 1-1, except that preliminary silicon-containing composite particles were mixed in the etching solution for 3 hours, and then methane was reacted in a hot zone at 920° C. for 4 hours.

Comparative Example 1-1

A negative electrode active material was prepared in the same manner as in Example 1-1, except that preliminary silicon-containing composite particles were not etched.

Comparative Example 1-2

A negative electrode active material was prepared in the same manner as in Example 1-1, except that preliminary silicon-containing composite particles were mixed in the etching solution for 6 hours, and then methane was reacted in a hot zone at 920° C. for 1 hour.

Comparative Example 1-3

A negative electrode active material was prepared in the same manner as in Example 1-1, except that methane was reacted with the silicon-containing composite particles in a hot zone at 970° C. for 5 hours.

TABLE 1

| | Pore size of silicon-containing composite particles (nm) | Pore size (nm) of negative electrode active material | $D_{50}$ (μm) of silicon-containing composite particles | Content of Mg element in negative electrode active material (wt %) | BET specific surface area of negative electrode active material ($m^2/g$) | Content of inner carbon layer (wt %) | Content of outer carbon layer (wt %) | Thickness of outer carbon layer (nm) |
|---|---|---|---|---|---|---|---|---|
| Example 1-1 | 20 | 15 | 5 | 3.5 | 8.1 | 21.5 | 3.5 | 30 |
| Example 1-2 | 25 | 22 | 5 | 2.3 | 9.0 | 25.0 | 3.4 | 30 |
| Example 1-3 | 25 | 20 | 5 | 1.5 | 8.7 | 25.3 | 5.1 | 50 |
| Example 1-4 | 35 | 31 | 5 | 0.9 | 13.1 | 33.0 | 2.5 | 25 |
| Comparative Example 1-1 | 8 | 3 | 5 | 4.5 | 2.3 | 2.1 | 3.5 | 30 |
| Comparative Example 1-2 | 60 | 58 | 5 | 2.1 | 17 | 25.0 | 3.5 | 30 |
| Comparative Example 1-3 | 25 | 18 | 5 | 0.7 | 17.3 | 26.1 | 12 | 120 |

The specific surface areas of the silicon-containing composite particle and the negative electrode active material were measured by the Brunauer-Emmett-Teller (BET) method. Specifically, the specific surface areas were measured by a BET six-point method by a nitrogen gas adsorption distribution method using a porosimetry analyzer (Bell Japan Inc, Belsorp-II mini).

The size of the pores was measured by an equation according to a Barrett-Joyer-Halenda (BJH) method by a nitrogen adsorption method. Specifically, a pore area according to the size of pores was derived using a BELSORP-mini II model manufactured by BEL Japan, Inc., and then the size (Dp/nm) of pores showing the largest pore area (dVp/dDp) was measured.

The content of the Mg element was confirmed by ICP analysis. Specifically, after a predetermined amount (about 0.01 g) of the negative electrode active material was aliquoted, the negative electrode active material was completely decomposed on a hot plate by transferring the aliquot to a platinum crucible and adding nitric acid, hydrofluoric acid, or sulfuric acid thereto. Thereafter, a reference calibration curve was prepared by measuring the intensity of a standard liquid prepared using a standard solution (5 mg/kg) in an intrinsic wavelength of the Mg element using an inductively coupled plasma atomic emission spectrometer (ICPAES, Perkin-Elmer 7300). Thereafter, a pre-treated sample solution and a blank sample were each introduced into the apparatus, an actual intensity was calculated by measuring each intensity, the concentration of each component relative to the prepared calibration curve was calculated, and then the content of the Mg element of the prepared negative electrode active material was analyzed by converting the total sum so as to be the theoretical value.

The average particle diameter ($D_{50}$) of the silicon-containing particles may be defined as a particle diameter based on 50% of the particle diameter distribution. The average particle diameter was measured using a laser diffraction method.

The inner carbon layer of the negative electrode active material was confirmed by the energy dispersive spectrometer (EDAX) analysis of the SEM cross section.

The thickness of the outer carbon layer of the negative electrode active material was measured through TEM.

The content of the entire carbon layer of the negative electrode active material was measured by burning the sample together with a combustion improver in an oxygen stream using a CS analyzer.

The content of the outer carbon layer of the negative electrode active material was confirmed by calculation using the size of the negative electrode active material particles, the thickness of the outer carbon layer, and the true density of the carbon layer, and the content of the inner carbon layer was confirmed by calculation from the difference between the content of the entire carbon layer and the content of the outer carbon layer. Specifically, the diameter of silicon-containing composite particles was measured using a particle size analyzer before forming a carbon layer, and after the thickness of the outer carbon layer provided in the silicon-containing composite particles is measured through TEM after forming the carbon layer, the volume of each of the silicon-containing composite particles and the negative electrode active material was calculated from this measurement, and each mass and the content of the outer carbon layer were calculated by multiplying the volume and the true density. The true density was measured using a pycnometer (AccuPyc1340, Micromeritics Instrument Corp. USZ).

Experimental Example 1: Evaluation of Discharge Capacity, Initial Efficiency, and Service Life (Capacity Retention Rate) Characteristics Negative electrodes and batteries were prepared using the negative electrode active materials in the Examples and the Comparative Examples, respectively.

A mixed negative electrode active material in which the negative electrode active material and natural graphite were mixed at a weight ratio of 1:9, carbon black as a conductive material, and carboxymethyl cellulose (CMC) and styrene butadiene rubber (SBR) as binders were mixed with water as a solvent at a weight ratio of the mixed negative electrode active material:the conductive material:the binder (CMC): the binder (styrene butadiene)=95.4:1:1.1:2.5, thereby preparing a negative electrode slurry. (The solid content was about 47 wt % with respect to the total weight of the negative electrode slurry). After the negative electrode slurry was applied to a copper (Cu) metal thin film as a negative electrode current collector and dried, the metal thin film was punched, thereby preparing a negative electrode.

As a counter electrode, a Li metal was used. After a polyolefin separator was interposed between the negative electrode and Li metal, an electrolyte solution in which 1 M $LiPF_6$ was dissolved was injected into a solvent in which ethylene carbonate (EC) and diethyl carbonate (EMC) were mixed at a volume ratio of 3:7, thereby preparing a lithium coin-type half battery.

The discharge capacity, initial efficiency, and capacity retention rate were evaluated by charging and discharging the prepared battery, and are shown in the following Table 2.

For the 1st and 2nd cycles, the battery was charged and discharged at 0.1 C, and from the 3rd to 49th cycles, the battery was charged and discharged at 0.5 C. The 50th cycle was completed in a charged state (with lithium contained in the negative electrode).

Charging conditions: CC (constant current)/CV (constant voltage) (5 mV/0.005 C current cut-off)

Discharging conditions: CC (constant current) conditions 1.5 V voltage cut-off

The discharge capacity (mAh/g) and initial efficiency (%) were derived from the results during one-time charge/discharge. Specifically, the single discharge capacity and initial efficiency of the negative electrode active material of the present invention were calculated by inversely converting the charge/discharge capacity and initial efficiency in consideration of the fact that the single discharge capacity and initial efficiency of graphite are 365 mAh/g and 93%, respectively.

Discharge capacity (mAh/g) of negative electrode active material=(measured discharge capacity−(0.9×365))×10

Charge capacity (mAh/g) of negative electrode active material=(measured charge capacity−(0.9×365/0.93))×10

Initial efficiency (%)=(discharge capacity (mAh/g) of negative electrode active material/charge capacity (mAh/g) of negative electrode active material)×100

The charge retention rate was derived by the following calculation.

Capacity retention rate (%)=(49 times discharge capacity/1 time discharge capacity)×100

TABLE 2

| Battery | Discharge capacity (mAh/g) | Initial efficiency (%) | Capacity retention rate (%) |
|---|---|---|---|
| Example 1-1 | 1640 | 84.8 | 84.5 |
| Example 1-2 | 1690 | 85.3 | 85.7 |
| Example 1-3 | 1673 | 85.1 | 85.4 |
| Example 1-4 | 1651 | 84.5 | 84.7 |
| Comparative Example 1-1 | 1490 | 79.5 | 81.9 |
| Comparative Example 1-2 | 1629 | 82.9 | 80.2 |
| Comparative Example 1-3 | 1597 | 82.1 | 80.8 |

The negative electrode active material according to the present invention is characterized by including pores in the silicon-containing composite particles and including an inner carbon layer provided in the pore and an outer carbon layer provided on the surface of the silicon-containing composite particle, and the service life characteristics of a battery may be improved because the change in volume of the negative electrode active material is readily suppressed during the charging and discharging of the battery and the conductivity of the negative electrode active material is improved. Therefore, it can be confirmed that Examples 1-1 to 1-4 in which the negative electrode active material according to the present invention is used exhibit excellent discharge capacities, initial efficiencies, and capacity retention rates.

In contrast, it can be confirmed that the service life characteristics of the battery deteriorate because the negative electrode active material used in Comparative Example 1-1 has a small BET specific surface area, and thus cannot effectively suppress the change in volume of the negative electrode active material during charging and discharging. Furthermore, it can be confirmed that the side reactions between the electrolytic solution and the negative electrode active material are increased, leading to deterioration in the service life characteristics of the battery because the negative electrode active material used in Comparative Examples 1-2 and 1-3 has too large pores, or a carbon layer is not appropriately provided, and the BET specific surface area is too large.

EXAMPLE 2

Example 2-1

(1) Formation of Preliminary Silicon-Containing Composite Particles

A powder in which a Si powder and a $SiO_2$ powder were uniformly mixed at a molar ratio of 1:1 was heat-treated at 1,400° C. in a reduced pressure atmosphere to recover a SiO powder. After the recovered SiO powder and a Li metal powder were heat-treated at a temperature of 800° C. in an inert atmosphere for 1 hour, particles were prepared by performing an additional heat treatment at a temperature of 900° C. for 3 hours. The particles were pulverized by a jet mill to form preliminary silicon-containing composite particles.

(2) Formation of Silicon-Containing Composite Particles

A mixed solution of hydrofluoric acid and ethanol was used as an etching solution. After the preliminary silicon-containing composite particles were put into the etching solution at a weight ratio of 20:1 and mixed for about 1 hour and 30 minutes, the resulting mixture was filtered, washed and dried to form silicon-containing composite particles. The prepared silicon-containing composite particles have an average particle diameter ($D_{50}$) of 5 μm, and a pore size of 15 nm.

(3) Formulation of Preliminary Negative Electrode Active Material

The silicon-containing composite particles were positioned in a hot zone of a CVD apparatus while maintaining an inert atmosphere by flowing Ar gas into the silicon-containing composite particles, and the methane was blown into the hot zone at 920° C. using Ar as a carrier gas to react the methane at $10^{-1}$ torr for 3 hours, thereby forming a preliminary negative electrode active material in which an outer carbon layer (thickness 30 nm) provided on the surface of the silicon-containing composite particle and an inner carbon layer provided inside the pores were formed.

(4) Preparation of Negative Electrode Active Material

A negative electrode active material was prepared by performing an additional heat treatment (second heat treatment) on the preliminary negative electrode active material in which the outer carbon layer and the inner carbon layer were formed at 950° C. for 3 hours to control the size and number of pores in the silicon-containing composite particles. The negative electrode active material had an average particle diameter ($D_{50}$) of 5 μm, and a BET specific surface area of about 7.5 $m^2/g$.

The content of the Li element in the negative electrode active material was 2.1 wt %, and the outer carbon layer and the inner carbon layer were included in a total weight of 24.9 wt % based on total 100 wt % of the negative electrode active material. Specifically, the outer carbon layer and the inner carbon layer were included in an amount of 3.2 wt % and 21.4 wt %, respectively, based on total 100 wt % of the negative electrode active material.

Example 2-2

A negative electrode active material was prepared in the same manner as in Example 2-1, except that preliminary silicon-containing composite particles were mixed in the etching solution for 2 hours.

Example 2-3

A negative electrode active material was prepared in the same manner as in Example 2-1, except that methane was reacted with the silicon-containing composite particles in a hot zone at 920° C. for 5 hours.

Example 2-4

A negative electrode active material was prepared in the same manner as in Example 2-1, except that preliminary silicon-containing composite particles were mixed in the etching solution for 3 hours, and then methane was reacted in a hot zone at 920° C. for 4 hours.

Comparative Example 2-1

A negative electrode active material was prepared in the same manner as in Example 2-1, except that preliminary silicon-containing composite particles were not etched.

Comparative Example 2-2

A negative electrode active material was prepared in the same manner as in Example 2-1, except that preliminary silicon-containing composite particles were mixed in the etching solution for 6 hours, and then methane was reacted in a hot Zone at 920° C. for 1 hour.

Comparative Example 2-3

A negative electrode active material was prepared in the same manner as in Example 2-1, except that methane was reacted with the silicon-containing composite particles in a hot zone at 970° C. for 5 hours.

TABLE 3

| | Pore size of silicon-containing composite particles (nm) | Pore size (nm) of negative electrode active material | $D_{50}$ (μm) of silicon-containing composite particles | Content of Li element in negative electrode active material (wt %) | BET specific surface area of negative electrode active material ($m^2/g$) | Content of inner carbon layer (wt %) | Content of outer carbon layer (wt %) | Thickness of outer carbon layer (nm) |
|---|---|---|---|---|---|---|---|---|
| Example 2-1 | 15 | 13 | 5 | 2.1 | 7.5 | 21.4 | 3.2 | 30 |
| Example 2-2 | 22 | 19 | 5 | 1.8 | 8.1 | 24.5 | 3.3 | 30 |
| Example 2-3 | 22 | 18 | 5 | 1.3 | 7.9 | 25.4 | 5.2 | 50 |
| Example 2-4 | 33 | 29 | 5 | 0.7 | 10.7 | 33.2 | 2.6 | 25 |
| Comparative Example 2-1 | 7 | 3 | 5 | 3.3 | 2.1 | 2.0 | 3.4 | 30 |
| Comparative Example 2-2 | 58 | 55 | 5 | 1.8 | 16 | 25.2 | 3.5 | 30 |
| Comparative Example 2-3 | 23 | 20 | 5 | 0.4 | 16.3 | 26.0 | 12.3 | 120 |

Experimental Example 2: Evaluation of Discharge Capacity, Initial Efficiency, and Service Life (Capacity Retention Rate) Characteristics Negative electrodes and batteries were prepared in the same manner as in Experimental Example 1 using the negative electrode active materials in the Examples and the Comparative Examples, respectively.

The discharge capacity, initial efficiency, and capacity retention rate were evaluated as in Experimental Example 1 by charging and discharging the prepared battery, and are shown in the following Table 4.

TABLE 4

| Battery | Discharge capacity (mAh/g) | Initial efficiency (%) | Capacity retention rate (%) |
|---|---|---|---|
| Example 2-1 | 1701 | 85 | 83.9 |
| Example 2-2 | 1720 | 85.8 | 84.7 |
| Example 2-3 | 1712 | 85.7 | 84.5 |
| Example 2-4 | 1705 | 84.9 | 85.1 |
| Comparative Example 2-1 | 1501 | 79.7 | 81.5 |
| Comparative Example 2-2 | 1635 | 83.2 | 79.2 |
| Comparative Example 2-3 | 1601 | 81.8 | 79.8 |

The negative electrode active material according to the present invention is characterized by including pores in the silicon-containing composite particles and including an inner carbon layer provided in the pore and an outer carbon layer provided on the surface of the silicon-containing composite particle, and the service life characteristics of a battery may be improved because the change in volume of the negative electrode active material is readily suppressed during the charging and discharging of the battery and the conductivity of the negative electrode active material is improved. Therefore, it can be confirmed that Examples 2-1 to 2-4 in which the negative electrode active material according to the present invention is used exhibit excellent discharge capacities, initial efficiencies, and capacity retention rates.

In contrast, it can be confirmed that the service life characteristics of the battery deteriorate because the negative electrode active material used in Comparative Example 2-1 has a small BET specific surface area, and thus cannot effectively suppress the change in volume of the negative electrode active material during charging and discharging. Furthermore, it can be confirmed that the side reactions between the electrolytic solution and the negative electrode active material are increased, leading to deterioration in the service life characteristics of the battery because the negative electrode active material used in Comparative Examples 2-2 and 2-3 has too large pores, or a carbon layer is not appropriately provided, and the BET specific surface area is too large.

The invention claimed is:

1. A negative electrode active material comprising:

silicon-containing composite particles comprising (a) $SiO_x$, wherein 0<x<2, (b) pores, and (c) a Mg compound or a Li compound;

an outer carbon layer present on a surface of the silicon-containing composite particles; and an inner carbon layer present inside the pores, wherein a pore size of the pores is 1 nm to 40 nm, and wherein a BET specific surface area of the negative electrode active material is 3 $m^2/g$ to 15 $m^2/g$.

2. The negative electrode active material of claim 1, wherein a Mg element is present in an amount of 0.1 wt % to 10 wt % based on a total 100 wt % of the silicon-containing composite particles.

3. The negative electrode active material of claim 1, wherein a Li element is present in an amount of 0.1 wt % to 10 wt % based on a total 100 wt % of the silicon-containing composite particles.

4. The negative electrode active material of claim 1, wherein a total wt % of the outer carbon layer and the inner carbon layer is 5 wt % to 40 wt % based on a total 100 wt % of the negative electrode active material.

5. The negative electrode active material of claim 1, wherein the outer carbon layer is present in an amount of 1 wt % to 10 wt % based on a total 100 wt % of the negative electrode active material.

6. The negative electrode active material of claim 1, wherein the inner carbon layer is present in an amount of 4 wt % to 35 wt % based on a total 100 wt % of the negative electrode active material.

7. The negative electrode active material of claim 1, wherein the negative electrode active material has an average particle diameter ($D_{50}$) of 2 μm to 15 μm.

8. A method for preparing the negative electrode active material according to claim 1, the method comprising:

forming silicon-containing composite particles comprising pores from preliminary silicon-containing composite particles comprising $SiO_x$, where 0<x<2, and a Mg compound or a Li compound;

forming a preliminary negative electrode active material comprising an outer carbon layer and an inner carbon layer by disposing a carbonaceous precursor on the silicon-containing composite particles, and then subjecting the carbonaceous precursor to a first heat treatment; and subjecting the preliminary negative electrode active material to a second heat treatment.

9. The method of claim 8, wherein the forming of the silicon-containing composite particles comprising pores from preliminary silicon-containing composite particles comprising $SiO_x$, where 0<x<2, and a Mg compound or a Li compound comprises etching the preliminary silicon-containing particles using an acid or a base.

10. The method of claim 8, wherein the first heat treatment is performed at a temperature of 600° C. to 1100° C.

11. The method of claim 8, wherein the second heat treatment is performed at a temperature of 600° C. to 1100° C.

12. A negative electrode comprising the negative electrode active material according to claim 1.

13. A secondary battery comprising the negative electrode of claim 12.

* * * * *